United States Patent [19]

Alden et al.

[11] Patent Number: 4,942,862
[45] Date of Patent: Jul. 24, 1990

[54] UNIVERSAL RACK FOR BARBECUE GRILL

[75] Inventors: J. Michael Alden, Palatine; Erich J. Schlosser, Barrington; James C. Stephen, Arlington Heights, all of Ill.

[73] Assignee: Weber-Stephen Products Co., Palatine, Ill.

[21] Appl. No.: 390,643

[22] Filed: Aug. 7, 1989

[51] Int. Cl.$^5$ .............................................. F24C 15/00
[52] U.S. Cl. .............................. 126/337 R; 126/41 R; 99/450; 99/426
[58] Field of Search ................. 126/337 R, 333, 41 R; 99/450, 426

[56] References Cited

U.S. PATENT DOCUMENTS

| | | | |
|---|---|---|---|
| 943,593 | 12/1909 | Dresdner | 126/337 R |
| 2,144,278 | 1/1939 | Wallace | 126/41 R |
| 2,847,932 | 8/1958 | More | 126/337 R |
| 3,096,707 | 7/1963 | Mills | 99/450 |

OTHER PUBLICATIONS

Weber "Unstoppable in '85" Catalog: contains front and back covers, pp. 28 and 29, (no other date known).

Primary Examiner—Carroll B. Dority
Attorney, Agent, or Firm—Wallenstein, Wagner & Hattis, Ltd.

[57] ABSTRACT

A universal food holder for a barbecue grill includes a generally rectrangular frame (32) that has opposite sides (34) and opposite ends (36) with opposite sides having slots (46) therein for receiving opposite ends of food support elements. The food support elements (72, 82) are configured to provide a cradle for the food product that is being cooked and have opposite ends received into the slots in the side frame member. The food support elements can take a variety of configurations to suit the desires of the food which is being cooked but all are designed to be usable with the same frame. The side frame members are reinforced by vertical flanges (44) while the end frame members are likewise reinforced (52) and defined support ledges for food products. Also, the end members or pieces have apertures (58) therein which receive opposite ends of support bars which are designed to support a drip pan below the food support articles.

8 Claims, 2 Drawing Sheets

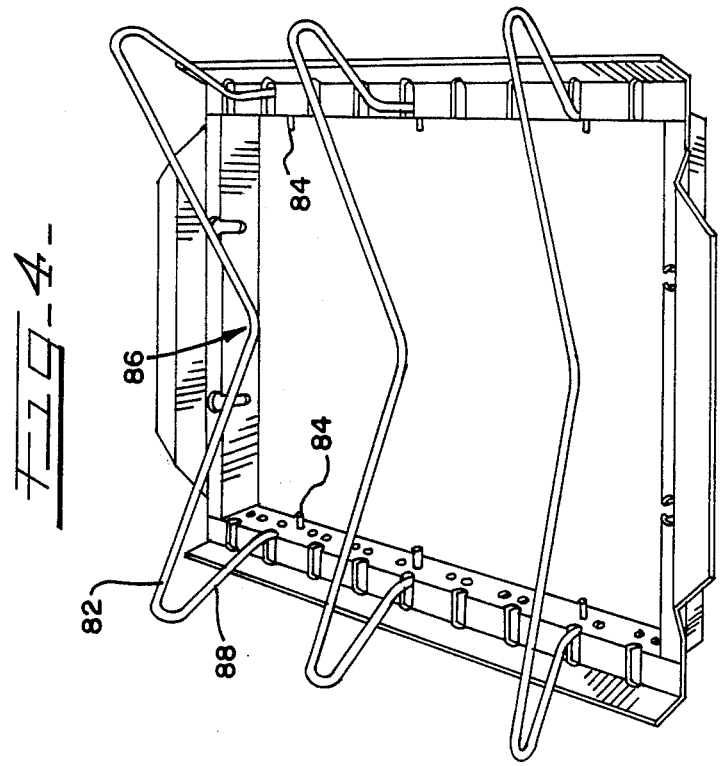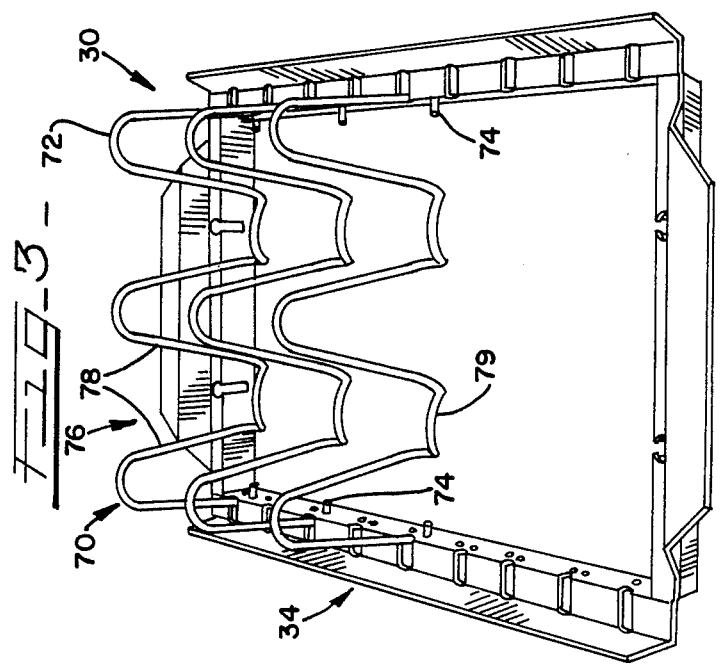

UNIVERSAL RACK FOR BARBECUE GRILL

BACKGROUND PRIOR ART

Outdoor cooking devices have been in existence for many years and can be found in virtually all residences. These cooking devices generally consist of some type of combustion source such as charcoal briquettes or gas burners located in the bottom of a vessel which has a food support grid immediately adjacent an upper open end thereof. Usually these devices have a cover to enclose the food during the cooking process.

One such type of barbecue grill or kettle that has been marketed by the Assignee of the present invention is disclosed in U.S. Pat. No. 4,416,248. Another exemplary barbecue grill marketed by the Assignee of the present invention is disclosed in U.S. Pat. No. 4,677,964.

Because of the potential market for outdoor cooking devices of the above type, various accessories have been developed for use in connection with the conventional barbecue grill that has a food supporting grid supported therein. Examples of such accessories are racks that are used for holding food during the cooking process, roast holders, condiment holders, and various other holders for supporting other food products. Exemplary of one type of accessory is disclosed in U.S. Pat. No. 4,458,585, assigned to the Assignee of the present invention which discloses a wire rack that is configured to support food products, such as ears of corn or whole potatoes. Further examples are disclosed in Weber-Stephen Products Co. 1984 copyrighted catalog and illustrated on Pages 28 and 29 which are submitted as part of the record for the subject application.

One of the problems with prior known accessory food supporting devices is the fact that they are of a unitary construction and therefore occupy a substantial amount of space and also require larger packages for shipment and display. In addition, the known type of food support racks are difficult to clean because of the unitary construction.

Thus, there remains a need for a universal support rack that occupies less space when not in use, but is still extremely versatile in providing adequate support for various food products on an outdoor grill and can easily be separated for cleaning.

SUMMARY OF THE INVENTION

According to the present invention, a simplified universal rack has been developed which is specifically designed for supporting various food articles of varying configurations on a cooking grid or directly above the heat source for an outdoor barbecue grill. The universal rack is constructed such that it can be easily disassembled for cleaning and various components are interchangeable for supporting different food products on a single frame structure.

More specifically, the universal food rack or holder consists of a peripheral frame member that is adapted to be supported in a barbecue grill above a heat producing source and has food supporting elements releasably retained thereon. The peripheral frame member is preferably rectangular in configuration and has opposite sides and opposite ends. The opposite sides of the peripheral frame include a generally L-shaped member that has a horizontal leg and a vertical leg with a vertical flange extending upwardly from the free edge of the horizontal leg to define a generally stepped configuration in cross section. The L-shaped member has slot means for releasably retaining food support elements.

The opposite end members of the peripheral frame are likewise generally L-shaped in cross sectional configuration and include first and second L-shaped members that generally define a stepped configuration. More specifically, a first L-shaped member has a generally horizontal leg and a generally vertical leg while the second generally L-shaped member has a generally vertical leg extending from the free edge of the first horizontal leg and a second horizontal leg at the upper free edge thereof which produces a support ledge for supporting the frame structure within the grill.

The food support elements each include a circular rod consisting of a main body that has angularly offset opposite ends that are received into the slot means and preferably are snap fitted therein. Preferably the slot means consists of elongated slots in the horizontal leg of the side L-shaped member and apertures aligned with the elongated slots in the vertical leg. Thus, the opposite ends of the rods can be passed through the elongated slots and the angularly offset ends of the rod received are snap fitted into the apertures that form part of the slot means.

The food supporting elements and more particularly the circular rods are deformed intermediate opposite ends thereof to define support cradles for various types of food products. For example in one embodiment of the invention, the rods are bent to define a generally V-shaped upwardly opening cradle and cooperate with each other to define a cradle structure for large food products such as roasts or whole poultry products. In another embodiment of the invention, the rods are bent to define generally upwardly opening U-shaped cradles that are closed adjacent the bottom end to support elongated food products, such as ears of corn or whole potatoes.

According to one further aspect of the invention, the vertical flanges of the respective side members define upwardly exposed ledges for supporting elongated food supporting articles, such as metal skewers which are utilized for holding small pieces of foods, such as shish kebab.

According to one further aspect of the present invention, the universal frame is also readily adaptable to provide a support for a drip pan. For this purpose, the first L-shaped end members have vertically opening slots or apertures which are aligned with each other at opposite ends of the frame and receive generally planar elongated rods having heads at opposite ends so that a drip pan of the commercially available type or of the type that can be made from aluminum foil is supported directly below the food that is supported on the universal frame.

BRIEF DESCRIPTION OF DRAWINGS

FIG. 3 is a modified form of a food support element carried by the frame; and

FIG. 4 is a further modified form showing food support elements for supporting larger bulk food products as will be described.

DETAILED DESCRIPTION

Figure 1:
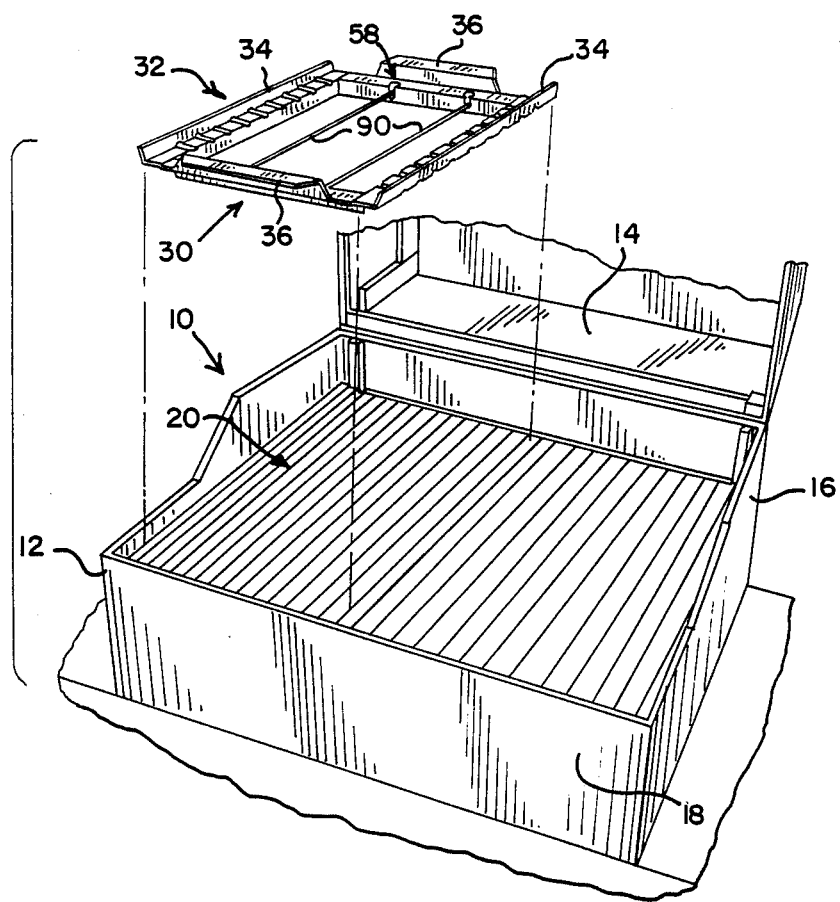
FIG. 1 is an exploded perspective view of the universal food holder particularly adapted to a barbecue grill.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

FIG. 1 discloses a barbecue kettle or grill generally designated by reference numeral 10 and is of the rectangular type shown in U.S. Pat. No. 4,677,964. The grill 10 includes a fire box or housing 12 that has a cover 14 hinged thereto. The grill disclosed in the subject patent is a gas grill and thus supports a plurality of elongated burner tubes (not shown) in the lower end thereof. The fire box 12 also incorporates a pair of ledges in opposite end walls 16 of the fire box as well as a second pair of ledges in opposite side walls 18. The respective ledges are designed to support first and second sets of sear bars between the lower heat producing source (not shown) and a food support grid 20 supported adjacent the upper open edge of the fire box 12. For further details of the barbecue grill, reference may be had to the above referenced patent, which is incorporated herein by reference.

According to the present invention, a universal food holder, generally designated by reference numeral 30, is designed such that the components thereof can readily be disassembled for cleaning and various parts are interchangeable to support different food products either directly over the gas heat source or indirectly through the use of a drip pan.

For this purpose, the universal food holder consists of a peripheral frame that is generally designated by reference numeral 32 (FIG. 2) which includes a pair of side members 34 and a pair of end members 36.

The respective side members 34 are identical in construction and consist of a generally L-shaped member that has a horizontal leg 40 and a generally vertical leg 42. Also, the generally L-shaped member has a vertical flange 44 integral with the free edge of the horizontal leg 40. The horizontal leg 40 and vertical leg 42 have slot means defined therein for releasably supporting food support elements, as will be described later. More specifically, the slot means consists of a generally elongated horizontal slot 46 that is defined in horizontal leg 40 and an aperture 48 in the vertical leg 42 that is aligned with the elongated slot 46. Any number of such slot means can be formed in the respective side frame members 34 and are aligned with each other on opposite sides of the frame 32. The slot means are configured to receive opposite ends of food support elements, as will be described below.

The end frame members 36 are again identical in construction and consist of first and second L-shaped members 50 and 52. The first L-shaped member 50 includes a generally horizontal leg 54 that is horizontally aligned with the horizontal legs 40 of the side members 34 and a depending second generally vertical leg 56. The first L-shaped member 50 also has a plurality of opening means 58 defined therein, for a purpose that will be described later.

The second L-shaped member includes a generally vertically leg 60 that is integral with the free edge of horizontal leg 54 and a second horizontal leg 6 that extends outwardly away from the first generally L-shaped member 50. Thus, the end members 36 define a generally stepped configuration including a first vertical leg 56, a second horizontal leg 54, a third vertical leg 60 and a fourth horizontal leg 62.

As indicated above, the universal food holder incorporates interchangeable food support elements for supporting different types of food products. Thus, as illustrated in FIG. 3, the generally rectangular frame 32 supports a plurality of substantially identical food support elements 70 that are each individually retained on the side members 34. Each food support element 70 consists of a generally circular rod or wire member 72 that has angularly offset end portions 74 on opposite ends thereof.

The intermediate body portion of each wire or rod 70 is deformed to a desired configuration to support a particular type of food product. Thus, as illustrated in FIG. 3, the rod 72 has a pair of generally U-shaped upwardly opening cradles 76 defined intermediate opposite ends 74. Each cradle 76 has generally vertical legs 78 that are interconnected at the lower ends by a cross member 79 which defines the bottom of the U-shaped configuration. Thus, large elongated items, such as ears of corn or whole potatoes, may be received into the respective U-shaped cradles 76 and supported at the lower end by the member 79.

Alternatively, as illustrated in FIG. 4, the food support elements may be in the form of circular rods 82 that again have opposite ends 84 that are angularly offset from the main body portion. The main body portion in this embodiment is bent or deformed to produce a generally V-shaped upwardly opening cradle 86 between the opposite ends. In this embodiment, the connecting sections 88 between the opposite ends 84 and the generally V-shaped center portion 86 are integrally formed and angularly offset from a vertical plane to provide sufficient rigidity and support for the elements and also for food that is to be cooked.

In the embodiment illustrated in FIG. 4, a plurality of wires or rods 82 cooperate to define an elongate a generally upwardly opening V-shaped cradle for supporting food products as large roasts or whole turkeys.

In assembling the food support elements onto the frame 30, it is only necessary to insert one free end 74, 84 of one circular rod through one of the elongated slots 46 and into a cooperating aperture 48. The circular rod or wire is then expanded so that the other opposite offset angular end portion 74, 84 is received through the slot and can be released so that it will be snap fitted into the aligned aperture. It will be noted that the rods will engage opposite edges of the slots 46 to maintain the support elements in an upright position.

The holder 30 can then be inserted into the firebox 12 and supported on the cooking grid 20. The legs 62 can be used as carrying handles when the food is served.

Figure 2:
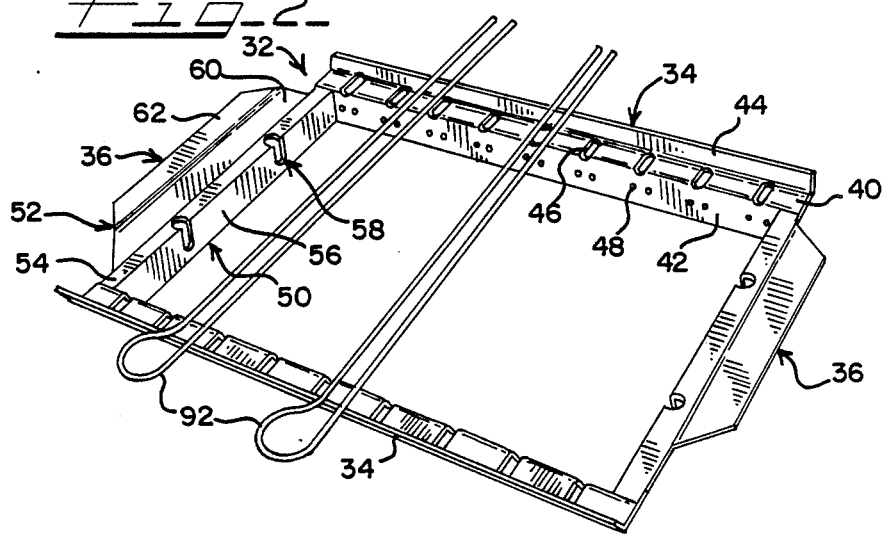
FIG. 2 is a perspective view of the peripheral frame utilized for one type of food supporting article.

As noted in FIG. 2, two apertures 48 are associated with each elongated slot 46 so that the angular orientation of the food support elements can be maintained without regard to the position of frame on the food support grid. Also, the frame is dimensioned such that two racks can be used in the larger grill of the type illustrated in U.S. Pat. No. 4,677,964. The rack 30 is also dimensioned to be supported on the cooking grid within the cover of the charcoal grill illustrated in U.S. Pat. No. 4,416,248.

With this particular construction, all of the food support elements can readily be removed from the frame 32 and can be cleaned individually while the frame structure can also be easily cleaned because it is formed in such a fashion that there are no welded joints or crevices.

As indicated above, a drip pan can be supported on the frame. Thus, two or more support rods 90 have opposite enlarged end portions (not shown) received into opening or aperture means 58. Rods 90 define a support surface for the drip pan (not shown) directly below the food and above the heat source.

One advantage of this particular construction, and particularly the frame construction, is the fact that the entire frame can easily be formed from one piece by a stamping process. Thus, the perimeter configuration of the side members 34 and the end members 36 could be formed in a flat condition and then reformed to the stepped configuration described above. Thereafter, the elongated slots 46 and the apertures 48 could be formed in the side members 34. During the stamping of the elongated slots, the vertical flanges 44 will provide sufficient rigidity to prevent any deformation of the horizontal legs of the side members and these same flanges also provide rigidity in use and at the same time produce a support ledge for supporting such items such as shish kebab skewers 92, as illustrated in FIG. 2.

As can be appreciated from the above description, the present invention provides a unique simplified type of universal food holder that can be easily disassembled for cleaning and storage requiring a minimum amount of space. Moreover, the food support elements can be configured to support any type of food product that might be cooked. For example, while not shown, the food support elements could also be configured to produce a rib rack wherein a slab of ribs could be held in a generally vertical position during the cooking process.

While specific embodiments have been described, it will be appreciated that detailed changes can be made without departing from the spirit of the invention. The wire or circular rods are preferably chrome plated metal conventional rod material but could take other configurations if desired. For example, the food support elements could be in the form of a bar of rectangular cross sectional construction that is bent to the configuration shown and has opposite ends adapted to be snap fitted on to the side members of the frame.

As a further alternative, the configuration of the rods could be other than those configurations shown to support different types of food products being cooked.

While the specific embodiments have been illustrated and described, numerous modifications come to mind without significantly departing from the spirit of the invention and the scope of protection is only limited by the scope of the accompanying Claims.

We claim:

1. A universal food holder for a barbecue grill comprising
    a peripheral frame member adapted to be supported in a grill above a heat producing source and having food support elements thereon,
    said frame being generally rectangular and having opposite sides and opposite ends to define an open space between said sides and said ends, said opposite sides each including a generally L-shaped side member having a vertical leg and a generally horizontal leg with slot means in said horizontal leg, and
    said food support elements comprising elongated members having cooperating connections at opposite ends releasably received into said slot means
    so that said food support elements may be releasable from said frame member for cleaning.

2. A universal food support holder as defined in claim 1, in which each of said opposite ends includes a first generally L-shaped end member having a first horizontal leg and a first vertical leg with a second generally L-shaped end member having a second generally vertical leg integral with a free edge of said first horizontal leg and a second horizontal leg extending peripherally outward of said first generally L-shaped end member and defining a support ledge for said frame member.

3. A universal food support holder as defined in claim 2, in which each generally first L-shaped end member has aperture means with support means received into said aperture means and extending across said open space for supporting a drip pan below said food support elements.

4. A universal food holder as defined in claim 1, in which said food support elements each include a circular rod having a main body with angularly offset opposite ends and said slot means includes an elongated slot in said horizontal leg and an aperture in said vertical leg aligned with said elongated slot so that said angularly offset opposite ends can be passed through said elongated slots and snap fitted into said apertures.

5. A universal food holder as defined in claim 4, in which each circular rod is bent between opposite ends to define a food supporting cradle.

6. A universal food holder as defined in claim 5, in which all of said rods are bent to define a generally V-shaped upwardly opening cradle.

7. A universal food holder as defined in claim 5, in which said circular rods are bent to define generally vertical U-shaped cradles.

8. A universal food holder as defined in claim 1, in which said L-shaped side members have a vertical flange integral with a free edge of said horizontal leg that define support ledges for generally planar food support articles.

* * * * *